United States Patent [19]

Rawlins

[11] 4,383,543
[45] May 17, 1983

[54] LIQUID TENSION-SENSITIVE GAS VALVES

[76] Inventor: Stephen L. Rawlins, 4461 Picacho Dr., Riverside, Calif. 92507

[21] Appl. No.: 228,108

[22] Filed: Jan. 26, 1981

[51] Int. Cl.³ .............................................. A01G 25/00
[52] U.S. Cl. .................................... 137/78.3; 47/48.5; 47/80; 239/64
[58] Field of Search ................. 137/78.2, 78.3, 624.11; 47/48.5, 79, 80, 81; 239/63, 64; 73/73

[56] References Cited

U.S. PATENT DOCUMENTS

| | | | |
|---|---|---|---|
| 2,653,449 | 9/1953 | Stauch | 47/48.5 |
| 2,941,174 | 6/1960 | Richards | 73/73 |
| 3,091,115 | 5/1963 | Roberts | 73/73 |
| 3,747,399 | 7/1973 | Treirat | 73/73 |
| 3,758,987 | 9/1973 | Crane, Jr. | 47/80 |
| 3,981,446 | 9/1976 | Hunter | 137/78.3 |
| 4,040,436 | 8/1977 | Caldwell | 47/79 |
| 4,055,200 | 10/1977 | Lohoff | 137/624.11 |
| 4,137,931 | 2/1979 | Hasenbeck | 73/73 |

*Primary Examiner*—A. Michael Chambers

[57] ABSTRACT

A liquid tension-sensitive gas valve for use in an environment containing liquid includes an inlet connectable to a source of gas and an outlet connectable to a receiver of gas. An internal porous member disposed between the inlet and the outlet has a plurality of pores having pore openings which are closed when filled with liquid and which are open when the tension (negative hydrostatic pressure) of the liquid therein has increased past a predetermined level. The internal member prevents movement of gas between the inlet and the outlet when the moisture content of the internal porous member has increased to cause the liquid tension to decrease below the predetermined level, wherein moisture has closed the pores. Conversely, the internal porous member permits the movement of gas between the inlet and the outlet when the moisture content therein has decreased to cause the liquid tension to exceed the predetermined level, wherein the pores are open. An external porous member having a plurality of pores and disposed between the internal porous member and the environment restrictably passes liquid between the environment and the internal porous member, thereby allowing moisture content of the environment to control the movement of gas through the valve through the internal porous member.

15 Claims, 7 Drawing Figures

LIQUID TENSION-SENSITIVE GAS VALVES

FIELD OF THE INVENTION

The present invention, in general, relates gas valves responsive to the tension of the liquid in the environment surrounding the valves and, in particular, relates to moisture-sensitive valves for use in irrigation which are either closed or open to the passage of air therethrough depending upon the moisture tension of the planting medium in which the valve is buried.

BACKGROUND OF THE INVENTION

Liquid tension-sensitive valves are used to selectively transmit gas from a gas source to a gas receiver depending upon the tension or energy status of the liquid surrounding the valve. Liquid tension-sensitive valves find wide use in agricultural applications. In such applications, the valve is buried in a planting medium and is used to pass air therefrom to an irrigation actuator as the moisture content of the planting medium decreases. The actuator then causes the medium to be irrigated, whereupon the moisture content thereof increases, which stops the passage of air through the valve and thus the irrigation.

Typical applications of liquid tension-sensitive valves are described in U.S. Pat. No. 3,981,466 (Hunter) and in U.S. Pat. No. 3,758,987 (Crane, Jr.). The Hunter patent utilizes a porous ceramic sensing element or valve at the end of a tube buried in a planting medium. After the medium has been irrigated, the pores of the valve are filled with water and cannot pass air from the ground through the tube to the pressure-responsive actuator controlling the irrigation system. As the soil dries out, the effective pressure of the water within it drops below the atmospheric pressure and the sensing element passes air from the soil to the actuator as soon as the liquid pressure in one of the pores becomes sufficiently negative, relative to the atmospheric pressure, to cause the pore to empty. The air passage initiates the irrigating of the medium which causes it to again return to a moistened state in which the pores of the sensing element are filled with water, thereby preventing the passage of air from the planting medium to the actuator and stopping the irrigation.

In the Crane, Jr. patent, a similar ceramic porous valve or sensing element is inserted into the soil and responds to the moisture of the soil to control the flow of water passing to the soil. When the soil is relatively dry, air flows through the porous element and water is allowed to flow to the soil. When the soil is wet, air cannot pass to the sensing element and the flow of water is terminated.

A basic limitation of the types of liquid tension-sensitive valves described in these prior art patents is that they are designed to receive gas only from the environment in which they are used and are incapable of receiving gas from a source of gas in one environment and transmitting it to a receiver of gas in a different environment solely in response to the liquid content of the environment surrounding the valve. In particular, the sensing devices in the Hunter and Crane, Jr. patents are typically placed near the surface of a planting medium. Irrigation is supplied to the planting medium depending upon the moisture content of the surface region. For thick planting mediums, this results in wasted irrigation insofar as the lower regions of the planting medium, which contain the root structure of the plants, are often still moist when the surface region has dried out and caused the sensor to pass air to an irrigation actuator to initiate the irrigating.

It would be advantageous to place one sensor in the lower portion of a planting medium and have irrigation supplied to the medium only when the lower portion is dry, and also utilize a second sensor or valve in the upper region of the medium to disable the passage of air from the lower sensor (to an irrigation actuator) in response to the moisture content of the upper region to prevent overwatering of the medium. As a result, the lower sensor would initiate the irrigation and the upper sensor would disable the irrigation before the lower sensor became completely moist, thereby allowing the irrigation supplied to the planting medium to gradually progress to the lower portions of the planting medium. Additionally, the upper sensor would prevent the irrigation from occurring if it was sufficiently moist, regardless of the moisture content of the lower sensor. As a result, the irrigation of the medium would be initiated depending upon the moisture content of the lower region and would be stopped or prevented from occurring depending upon the moisture content of the upper region. Therefore, plants would be forced to withdraw any water stored in the planting medium before receiving any more water from the irrigation system. Accordingly, the application of irrigation would be tailored precisely to the water use by the crop.

For such a system to operate properly, air must be passed from the sensor in the lower region through the sensor or valve in the upper region to the irrigation actuator, with the upper sensor only allowing air to pass to the actuator depending upon the moisture content of the upper region. Furthermore, the upper sensor must not itself pass air from the upper region to the irrigation actuator.

As the prior art does not disclose a sensor or valve meeting these requirements, it is the principal object of the present invention to provide a liquid tension-sensitive valve which is either closed or open to the passage of gas therethrough depending upon the tension or energy status of the liquid in the environment surrounding the valve.

It is another object of the present invention is selectively transmit gas from a gas source to a gas receiver in response to the liquid content of an environment different from the environments of the gas source and receiver.

It is yet another object of the present invention to allow two or more liquid tension-sensitive valves to be operated in series to selectively transmit gas from a gas source to a gas receiver.

It is yet another object of the present invention to provide a moisture-sensitive valve for use in an upper region of a planting medium to pass air from a moisture sensor in the lower region of the planting medium to an irrigation actuator to activate irrigation depending upon the moisture content of the lower region of the planting medium and to deactivate or inhibit irrigation depending upon the moisture content of the upper region of the medium.

SUMMARY OF THE INVENTION

The present invention, in a broad aspect, provides a liquid tension-sensitive gas valve for use in an environment containing liquid. The valve includes an inlet connectable to a source of gas and an outlet connectable to a receiver of gas. An internal porous member disposed within the valve between the inlet and the outlet has a plurality of pores having pore openings which are closed when filled with liquid and which are open when the tension of the liquid therein has increased past a predetermined level. The internal member prevents the movement of gas between the inlet and the outlet when its moisture content has increased to cause the tension to decrease below the predetermined level, wherein the pores are closed. Similarly, the internal member permits the movement of gas between the inlet and the outlet when its moisture content has decreased to cause the tension to exceed the predetermined level, wherein the pores are open. Disposed between the internal porous member and the environment in which the valve is placed is an external porous member. The external porous member restrictively passes liquid between the environment and the internal porous member, thereby allowing the moisture content of the environment to control the movement of gas between the inlet and the outlet through the internal porous member.

In accordance with one feature of the invention, the external member also has pore openings which are closed when filled with water which are open when the tension of the liquid therein has increased past a predetermined level. Accordingly, when the environment has a high moisture content, liquid from the environment passes through the external porous member to the internal porous member to raise its moisture content to prevent the passage of gas through the internal porous member. Conversely, as the environment dries to a low moisture content, liquid is drawn from the internal porous member through the external porous member back into the environment, thereby causing the liquid tension in the first porous member to increase past its predetermined level, whereupon the pores of the internal porous member open and allow gas to pass from the inlet to the outlet.

In accordance with another feature of the invention, the predetermined liquid tension level of the external porous member is greater than that of the internal porous member. Therefore, when the moisture content of the valve is at the predetermined level for the internal porous member, the pores thereof will allow gas to pass, but the pores of the external porous member will only pass moisture, thereby preventing the leakage of gas to the environment.

In accordance with a further feature of the invention, a plurality of embodiments of the valve are provided. The embodiments provide inlets and outlets disposed in different orientations for use in a wide range of applications.

In accordance with a final feature of the invention, a method of gating air from particulate planting medium to an actuator controlling an irrigation device applying water to the medium is provided wherein the level of moisture at a first (e.g., a lower) region of the planting medium is sensed with one moisture-sensing device. The device passes air through a tube to a second moisture sensing device in a second (e.g., an upper) region of the planting medium, which selectively passes the air to an irrigation actuator depending upon the moisture content of the second region. Accordingly, if the second region is already sufficiently wet when the first region is dry, irrigation is prevented. Similarly, if the first and second regions are dry and irrigation is activated, the second sensor disables the irrigation when the second region becomes sufficiently wet.

Other objects, features, and advantages of the present invention will become apparent from a consideration of the following detailed description and from the accompanying drawings.

DETAILED DESCRIPTION

Referring more particularly to the drawings, FIGS. 2-7 show four alternate embodiments 200, 300, 400, and 500 of a liquid tension-sensitive valve according to the present invention. The operation of the present invention will be described primarily in conjunction with the embodiment 400 of the present invention shown in FIGS. 4 and 5. The other embodiments 200, 300 and 500 operate in a similar manner and will only be briefly described.

Figure 1:
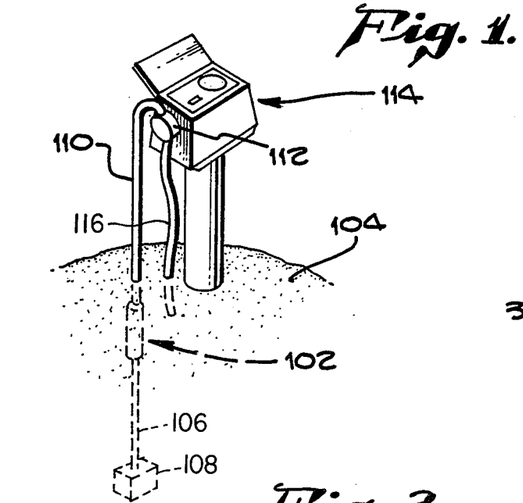
FIG. 1 shows a schematic diagram of an irrigating system incorporating a liquid tension-sensitive valve according to the present invention.
Figure 4:
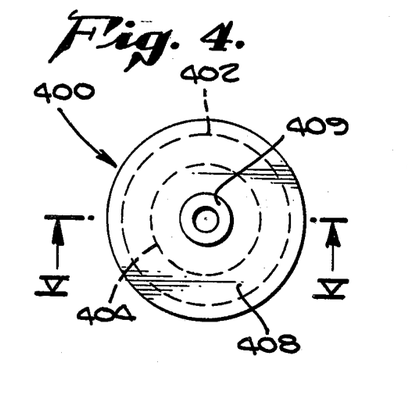
FIG. 4 shows a plan view of a third embodiment of a liquid tension-sensitive valve according to the present invention.

Preliminary to a description of FIGS. 4 and 5, reference is made to the irrigation system of FIG. 1, which includes a moisture sensing valve 102 according to the present invention, which may be any of the four embodiments 200, 300, 400 and 500 described hereinafter. The valve 102 is disposed in the upper region of a particulate planting medium 104 and communicates via a hose 106 to a porous moisture sensing device 108 in the lower portion of the planting medium. Similarly, the valve 102 connects via another hose 110 to an irrigation system actuator 112 connected to an irrigation control station 114 positioned above the planting medium 104. This particular irrigation system is described in detail in U.S. Pat. No. 3,981,446 (Hunter) and the operation of the system is incorporated herein by reference. The system described in the Hunter patent does not include the novel valve 102 according to the present invention and only includes the lower sensor 108 as the means for determining when irrigation should be supplied to the planting medium 104. Also, the "lower" sensor 108 is positioned in the upper portion of the planting medium. As described in the Hunter patent, the irrigation control station 114 supplies water to a tube 116 connected between the system actuator 112 and the soil 104. Air is passed from the sensor 108 to the actuator 112 when the soil is sufficiently dry. This allows the water in the hose 116 to drain from the tube, thereby creating a pressure differential across the actuator 112 which initiates the irrigation. When the sensor 108 is sufficiently moistened by the irrigation, the passage of air to the actuator 112 is stopped and the column of water in the tube 116 is thereby reestablished.

When the prior art system incorporates the novel valve 102 of the present invention in the upper region of the planting medium 104 with the prior art sensor 108 in the lower region of the medium, air may pass from the lower sensor to the actuator 112 only if the upper region is sufficiently dry.

An understanding of basic soil mechanics and the physics of capillarity as applied to the prior art sensor 168 is helpful to an understanding of the present invention. The prior art sensor 108 was a porous ceramic element buried in the soil. As long as the pores of the ceramic were filled with water, air could not pass therethrough to enter the tube connecting it to the irrigation station 114. As the soil dried out, the effective pressure of the water within the soil dropped below atmospheric pressure. Because the water within the ceramic was in contact with that in the soil through continuous moisture films, its pressure followed the changes in and remained the same as the pressure in the soil. A pressure decrease in the water contained in the pores of the sensing element due to loss of water was accompanied by an increase in curvature of the air-water interfaces between the pores and the soil atmosphere. As explained at pages 8 through 12 of the *Physics of Chemistry and Surfaces*, N. K. Adam, Oxford University Press, London, 1941, the curvature of the air-water interface in each of the pores is given by the equation $$P1 - P2 = S(1/R1 + 1/R2)$$

In this equation, P1 is the pressure of the air phase, P2 is the pressure in the capillary water present in each of the pores, R1 and R2 are the radii of curvature of the meniscus portions of the capillary water, and S is the surface tension of water. If the pores of the ceramic are cylindrical, R1 equals R2 equals R. Accordingly, for each pore, the equation then simplifies to:

$$P1 - P2 = 2S/R.$$

Furthermore, if the pressures are expressed as gauge pressure, atmospheric pressure is zero. If $-P2$ is defined as the tension (negative pressure) of the soil water, the equation reduces to $$T = 2S/R.$$

Accordingly, as the soil dries, T becomes greater; (i.e., the pressure within the pore water becomes more negative), and because S is a constant, R decreases. R can only decrease to a value equal to the radius of the pore. Accordingly, if water continues to be lost from the porous matrix in the sensing element 108, the surface meniscus will retreat along the pore. If enough water is lost the pore will empty.

When the first continuous pore through the matrix in the sensing element 108 becomes filled with air, it is no longer impermeable to air. This point is usually referred to as the bubbling pressure of the porous device. While bubbling pressure is usually measured by increasing the pressure on the air phase rather than decreasing the pressure on the liquid phase, both effects cause the same differential pressure across each of the pores. The air-phase pressure at which the first pore empties (the bubbling pressure), is identical in magnitude to the liquid phase tension at which it empties (the bubbling tension). When this point is reached with the prior art sensor 108, air can move from the soil through the tubing into the actuator 112. Accordingly, the prior art sensor is essentially a valve that is closed to the passage of air at tensions less than the bubbling tension, and is open to the passage of air at tensions greater than the bubbling tension.

An obvious limitation of the prior art sensing devices as typified by the sensor 108 used in the irrigation system of the Hunter patent is that it is only designed to pass air from the surrounding soil to the tubing connected to the sensor. As described previously, there is a need for a device which can selectively pass air from a sensor such as the prior art sensor 108 to an irrigation station depending upon the moisture content of the environment surrounding the device, which is assumed to be different than the moisture content of the environment surrounding the prior art sensor 108. Referring to FIGS. 4 and 5, the present invention fulfills this need by providing a valve 400 containing a internal porous member 404 surrounded by an external porous member 402. The internal porous member 404 communicates with an inlet 407 and an outlet 409 respectively connectable to a source of gas and a receiver of gas. Gas may only travel from the inlet 407 to the outlet 409 through the internal porous member 404 when the internal porous member is sufficiently dry.

The external porous member 402 allows liquid to pass from the surrounding environment to the internal porous member 404 to control its moisture content. Accordingly, the moisture content of the environment controls the travel of gas from the inlet 407 to the outlet 409, as opposed to prior art devices, in which gas travels from the environment to the valve outlet depending solely upon the moisture content of the environment.

The materials used for the internal porous member 404 and the external porous member 402 are similar except that their bubbling tensions are different. Both have pore openings which are closed when filled with liquid and which are open when the tension of the liquid therein has increased past a predetermined level for the device, which is the bubbling tension. As previously discussed, as these porous elements dry, the capillary tension within the pores increases (i.e., the pressure on convex capillary surface dividing the gas and liquid phases causes the surface to tighten as the pressure becomes more negative), and the capillary radius decreases. The radius of the capillary can only decrease to a value equal to the radius of the pore. A further decrease in the liquid content of the pore past the point at which the capillary radius equals the pore radius will result in the destruction of the capillary surface and the emptying of the pore. The tension level at which the capillary meniscus between the gas and liquid phases is destroyed is the bubbling tension.

Different bubbling tensions are achieved in the internal porous member 404 and the external porous member 402 by having smaller pore openings in the external porous member 402 than in the internal porous member 404. That is, the internal porous member 404 has high porosity and the external porous member 402 has low porosity. Smaller pore openings in the external porous member 402 will allow the surface tension of the capillary meniscus therein dividing the gas and liquid phases to increase to a greater level before breaking (because the radius of the meniscus may decrease to a smaller value before breaking as the porous element dries). Thus, the bubbling pressure of the external porous member 402 is greater than the bubbling pressure of the internal porous member 404.

The difference in bubbling pressures for the internal and external porous members 404 and 402 results in gas traveling through the internal porous member 404 before traveling through the external porous member 402 as the members 404 and 402 lose their liquid content while drying. Assuming gas is allowed to travel from the inlet 407 to the outlet 409 through the internal porous member to initiate an irrigation operation, the external porous member 402 will be remoistened by the application of liquid to the environment, thereby preventing gas from leaking from the internal porous member 404 to the environment through the external porous member 402 during normal operation of a system incorporation the valve 400. Thus, the external porous member only allows liquid, and not gas (as long as its bubbling tension is not exceeded) to pass radially through it from the environment to the internal porous member 404.

Referring again to FIG. 1, showing the system of U.S. Pat. No. 3,981,446 incorporating the novel liquid tension-sensitive valve 102 of the present invention, the operation of the irrigation system 100 is vastly improved with the valve 102. Air must pass from the lower sensor 108 through the valve 102 to reach the actuator 112. If the soil surrounding the lower sensor 108 is at a higher water content than its bubbling tension, or if the soil surrounding the valve 102 is at a higher water content than the bubbling pressure for its internal member 404, no air can pass to the actuator to initiate an irrigation operation. Conversely, when the soil surrounding the sensors 102 and 108 has a water content below their respective bubbling tensions, irrigation is applied to the soil. The upper valve 102 will thereafter interrupt the application of water by the irrigation system as soon as the water content of the soil exceeds the bubbling tension of the internal porous member 404. Thus, the water supplied to the soil must progress through the soil profile and be consumed by the plant roots before further water can be applied. The lower sensor 108 is, therefore, positioned at the maximum depth at which plant roots will absorb water. Such a system closely matches water application to water use by the various plants. The water application could be made to follow the water use even more closely by incorporating multiple valves 102 in series to determine the water content at specified levels of a soil profile.

Referring again to FIGS. 4 and 5 and to the construction of the valve 400 therein, the internal and external porous members 402 and 404 may be made of any porous material such as plastic, casting plaster or ceramic. The important criteria is that the bubbling pressure of the internal porous member 404 be much less than that of the external porous member 402. In this regard, certain combinations of bubbling pressures ratio for the internal and external porous members 404 and 402 have been found advantageous. For example, a 0.25 bar bubbling pressure for the internal porous member produces favorable results when used with a 1.0 bar bubbling pressure for the external porous member 402. Also, a 0.1 bar bubbling pressure for the internal porous member 404 produces advantageous results with a 15.0 bar bubbling pressure for the external porous member 404. A particularly advantageous combination is a 2.0 bar bubbling pressure for the internal porous member 404 and a 15.0 bar bubbling pressure for the external porous member 406. One way of fabricating the internal and external porous members 404 and 402 if they are ceramic is to insert the internal member 404 within the external member 402 in a "green" state and then fire it in place.

Regarding the inlet 407 and the outlet 409, various constructions can be used. For example, the inlet and outlet 407 and 409 can be nylon or copper tubing placed within solid end caps 408 and 406 of plastic material or the like. Similarly, the inlet 407 and outlet 409 can be integrally formed with the end caps 408 and 406, when material such as plastic is used for the end caps 408 and 406. The end caps 406 and 408 may be either press fit to the ends of the internal porous member 404 or may be attached by other means such as glue or the like. The end caps are sealed to the external porous member 402 with epoxy 410 and 412 or the like.

Figure 5:
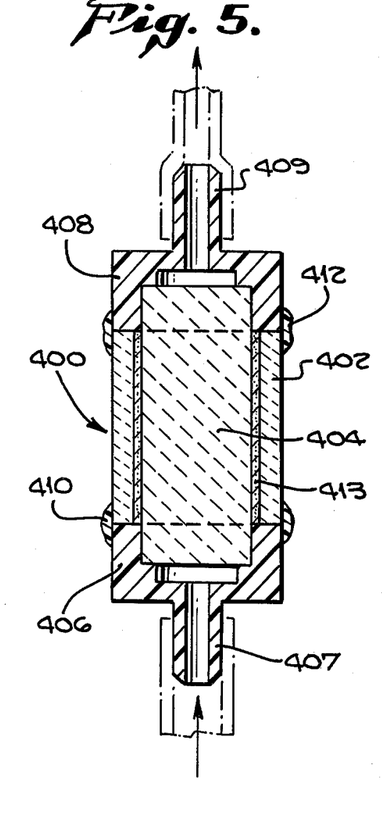
FIG. 5 shows a sectional view of the valve of FIG. 4, taken through the plane V—V.

As shown in FIG. 5, a fine porous material 413, such as dental casting material or a porous-fine dirt may be used to seal the internal porous member 402. This material 413 acts like a wick to transfer moisture between the internal and external porous members 404 and 402 by capillary action.

Figure 2:
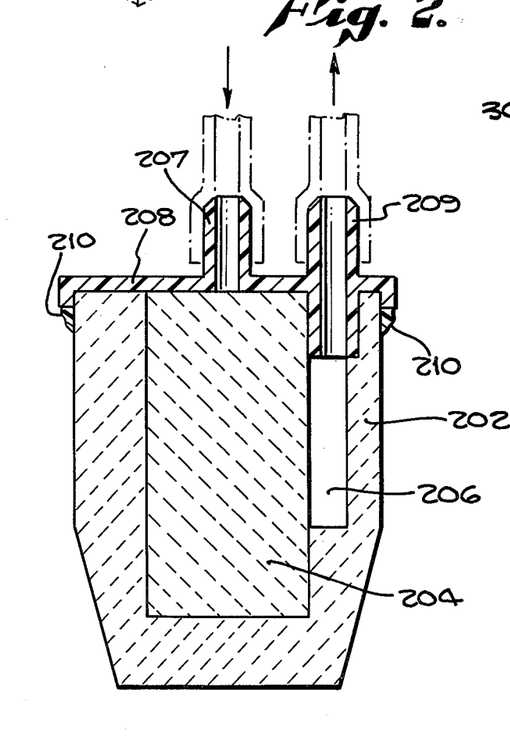
FIG. 2 shows a cross sectional view of one embodiment of a liquid tension-sensitive valve according to the present invention.

Turning now to the other embodiments of the novel valve according to the present invention, FIG. 2 shows a second embodiment 200 of a liquid tension-sensitive valve according to the present invention. In this embodiment 200, inlet and outlet ports 207 and 209 are integrally provided in an end cap 208 to the outer porous member 202 with epoxy 210. The inlet 207 communicates with an internal porous member 204 similar to that 404 of the embodiment shown in FIGS. 4 and 5 through bore 206. Completely surrounding the internal porous member 204 is an external porous member 202 also similar to that 402 previously described. The external porous member 202 is Randolph Castone, dental casting gypsum or the like, cast in place, and allows liquid to pass between the environment and the internal porous member 204 to control the travel of gas from the inlet 207 to the outlet 209 through the internal porous member 204.

Figure 3:
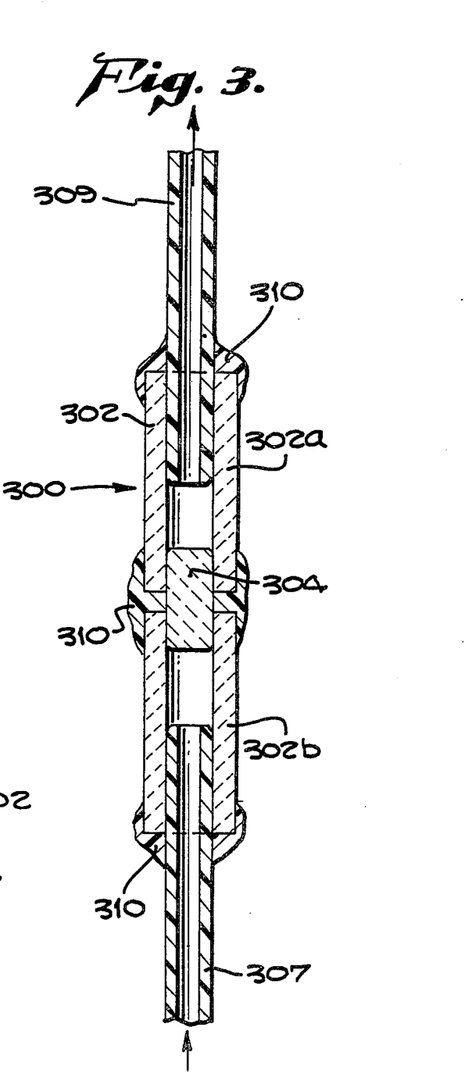
FIG. 3 shows a cross sectional view of a second liquid tension-sensitive valve according to the present invention.

FIG. 3 shows a third embodiment 300, in which tubing members 309 and 307 are axially positioned to communicate with an internal porous member 304 similar to the internal porous member 404 in the previous embodiment 400. Moisture from the environment in which the 300 is placed communicates with the internal porous member 304 via an external porous member 302 similar to that 402 of the previous environment. In this embodiment 300, the external porous member 302 is divided into two cylindrical halves 302a and 302b with the internal porous member 304 placed therebetween. Epoxy or the like 310 is used to hold the various elements together.

Figure 6:
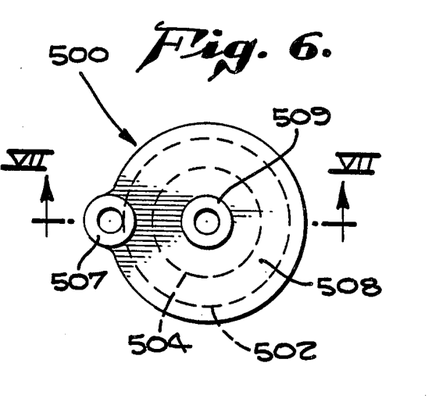
FIG. 6 shows a plan view of a fourth embodiment of a liquid tension-sensitive valve according to the present invention.
Figure 7:
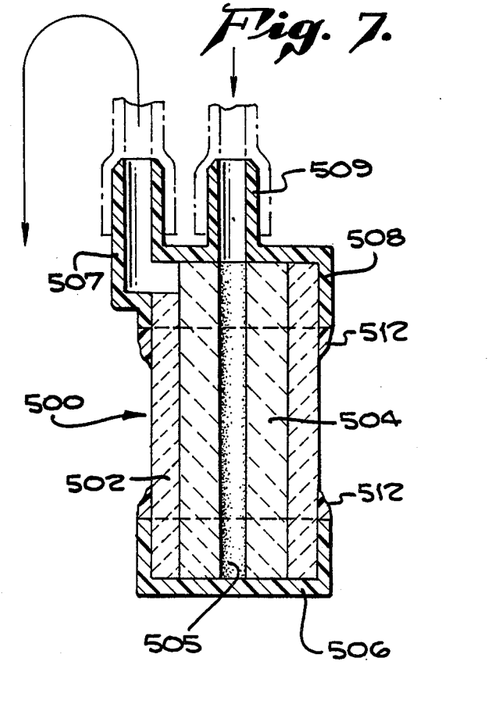
FIG. 7 shows a sectional view of the valve of FIG. 6, taken through the plane VII—VII.

FIGS. 6 and 7 show a fourth embodiment 500 of a liquid tension-sensitive valve according to the present invention. This embodiment is similar to the previous embodiments and uses an end cap 508 containing an integral inlet 509 and an outlet 507. The inlet 509 and outlet 507 communicate with an internal porous member 504. The porous member 504 has an axial bore 505 to allow gas to travel through as many pores as possible between the inlet 509 and the outlet 507 depending upon the liquid content of the internal member 504. As with the other embodiments, the liquid content of the internal porous member 504 is determined by liquid passing from the environment through an external porous member 502 of a higher bubbling pressure. Epoxy 512 is again utilized to hold the various elements together, and an end cap 506 is used to seal the bottom of the valve 500.

The various embodiments 200, 300, 400, and 500 function similarly, with the only difference being the physical arrangement of the inlet and outlet. Accordingly, compatibility of the invention with a wide range of applications is insured. It should be noted that a plurality of valves according to the present invention can be connected in series to sense the moisture content of any gradient (vertical, horizontal, inclined) in a planting medium and to control the irrigation thereof.

Beyond the irrigation application for the novel valve of the present invention, the valve may also be used for many other applications. For example, a plurality of the valves may be used as liquid level detectors in a series of storage tanks. In this application, the valves would not allow a tank filling valve to open to refill the tanks until the last tank was empty. The valves would be positioned at each tank such that the external member would extend within and below the level of the internal member, such that it was always in contact with the liquid at the bottom of the tank. Tension would develop within the external porous member as the liquid level dropped below it. The internal member would then pass gas when the liquid level below it corresponded to its bubbling tension. For example, if the pores of the internal element filled with gas at a tension corresponding to a hanging liquid column of 10 centimeters, the internal porous member would allow gas to pass whenever the liquid level dropped 10 centimeters below this level.

The novel valve of the present invention may be used in singular or series fashion with many other fluid-level detection systems. The invention is especially attractive for use with highly flammable fluids because of its passive, nonelectric nature.

In the foregoing description of the present invention, several alternative embodiments of the invention have been disclosed. It is to be understood that other mechanical and design variations are within the scope of the present invention. Thus, by way of example and not of limitation, the inlet and outlet ports could be disposed differently to communicate with the internal porous member; the physical relationship of the inner and outer porous members could be arranged differently to achieve the same result; different bubbling pressures than described could be used for the inner and outer porous members; and several outer porous members could be used to enclose a single inner porous member to achieve a more selective control for the passage of liquid between the environment and the inner porous member. Accordingly, the invention is not limited the particular embodiments which have been described in detail herein.

What is claimed is:

1. A liquid tension-sensitive gas valve for use in an environment containing liquid comprising:
    gas inlet means;
    gas outlet means;
    internal porous means, disposed internally within said value between said inlet and outlet means and having a plurality of pores with pore openings that are closed when filled with liquid and that are open when the tension of liquid therein has increased beyond a predetermined level, for preventing the movement of gas between said inlet and outlet means when the moisture content of said internal porous means has increased to cause said tension to decrease below said predetermined level wherein said pores are closed, and for permitting said movement when said moisture content has decreased to cause said tension to exceed said predetermined level, wherein said pores are open; and
    external porous means, having a plurality of pores and disposed between said internal porous means and said environment, for restrictably passing liquid between said environment and said internal porous means, thereby allowing the moisture content of said environment to control the movement of gas through said valve through said internal porous means.

2. A valve as defined in claim 1, wherein said pores of said external porous means have pore openings which are closed when filled with liquid and which are open when the tension of liquid therein has increased beyond a predetermined level, whereby:
    (i) when said environment has a high moisture content, liquid from said environment freely passes through said external porous means to said internal porous means to raise the moisture content thereof to prevent said movement of gas through said internal porous means, and
    (ii) as said environment dries to have a low moisture content, liquid is drawn from said internal porous means through said external porous means into said environment, thereby causing said liquid tension in said internal porous means to increase past said predetermined level for said internal porous means, whereupon said pores of said internal porous means are open and gas may travel from said inlet means to said outlet means.

3. A valve as defined in claim 2, wherein:
    said predetermined liquid tension level of said external porous means is higher than said predetermined level of said external porous means, whereby, when the moisture content of said valve is at said predetermined level for said internal porous means, gas may travel through said pores of said internal porous means, but said pores of said external porous means will only pass moisture, thereby allowing only moisture and not gas to travel between said internal porous means and said environment.

4. A valve as defined in claim 2, wherein:
    said internal porous means comprises porous material having a bubbling pressure approximately two bars; and
    said external porous means comprises porous material having a bubbling pressure approximately fifteen bars, whereby said liquid tension in said external porous means must rise to a greater level for said pores therein to open than must said liquid tension in said internal porous means for said pores therein to open, whereby:
    (i) gas may travel through said internal porous means more easily than through said external porous means, and
    (ii) said external porous means provides a passage only for moisture between said internal porous means and said environment to allow the moisture content of said environment to control the passage of gas through said internal porous means as long as said liquid tension of said environment does not exceed fifteen bars.

5. A valve as defined in claim 4, wherein said porous material is ceramic.

6. A valve as defined in claim 1, wherein said valve further comprises:

means disposed between said internal porous means and said external porous means for enhancing the transfer of moisture therebetween.

7. A valve as defined in claim 8, wherein: said enhancing means comprises finely granulated porous material.

8. A liquid tension-sensitive gas valve for use in an environment containing liquid comprising:
gas inlet means, said inlet means comprising a first end cap for said valve having an integral tube therein;
gas outlet means, said outlet means comprising a second end cap for said valve having an integral tube therein, said first and second end caps being disposed at opposite ends of said valve and said first and second tubes being axially aligned;
internal porous means, sealingly disposed in said valve communicating with said first and second end caps and having a plurality of pores with pore openings that are closed when filled with liquid and that are open when the tension of liquid therein has increased beyond a predetermined level, for preventing the movement of gas between said inlet and outlet means when the moisture content of said internal porous means has increased to cause said tension to decrease below said predetermined level wherein said pores are closed, and for permitting said movement when said moisture content has decreased to cause said tension to exceed said predetermined level, wherein said pores are open; and
external porous means, having a plurality of pores and disposed between said end caps and between said internal porous means and said environment and providing an outer wall for said valve, for restrictably passing liquid between said environment and said internal porous means, whereby:
(i) liquid from said environment must penetrate said external porous means to reach said internal porous means to close said pores thereof to prevent the passage of gas from said inlet means to said outlet means, and
(ii) as said environment dries, liquid passes from said internal porous means through said external porous means to said environment until said liquid tension of said liquid in said internal porous means increases beyond said predetermined level thereof, whereupon said pores of said internal porous means open and gas travels from said inlet means to said outlet means.

9. A liquid tension-sensitive gas valve for use in an environment containing liquid comprising:
end cap means;
gas inlet tube means, integral in said end cap means;
gas outlet tube means, integral in said end cap means;
internal porous means, disposed internally within said valve in sealing relation with said cap means and communicating with said gas inlet means and having a plurality of pores with pore openings that are closed when filled with liquid and that are open when the tension of liquid therein has increased beyond a predetermined level, for preventing the movement of gas between said inlet and outlet means when the moisture content of said internal porous means has increased to cause said tension to decrease below said predetermined level wherein said pores are closed, and for permitting said movement when said moisture content has decreased to cause said tension to exceed said predetermined level, wherein said pores are open; and
external porous means, having a plurality of pores and completely surrounding said internal porous means and providing an outer wall for said valve and exposed to said environment and having a bore adjacent said internal porous means communicating with said outlet means, for allowing the moisture content of said environment to control the movement of gas through said valve through said internal porous means, whereby:
(i) liquid from said environment must penetrate said external porous means to reach said internal porous means to close said pores thereof to prevent the passage of gas from said inlet means to said outlet means, and
(ii) as said environment dries, liquid passes from said internal porous means through said external porous means to said environment until said liquid tension of said liquid in said internal porous means increases beyond said predetermined level thereof, whereupon said pores of said internal porous means open and gas passes from said inlet means to said outlet means.

10. A liquid tension-sensitive gas valve for use in an environment containing liquid comprising:
gas inlet tube means;
gas outlet tube means axially aligned with said inlet means;
internal porous means, generally cylindrical in shape and disposed internally within said valve between said inlet and outlet means and having a plurality of pores with pore openings that are closed when filled with liquid and that are open when the tension of liquid therein has increased beyond a predetermined level, for preventing the movement of gas between said inlet and outlet means when the moisture content of said internal porous means has increased to cause said tension to decrease below said predetermined level wherein said pores are closed, and for permitting said movement when said moisture content has decreased to cause said tension to exceed said predetermined level, wherein said pores are open; and
external porous means, having a plurality of pores and generally cylindrical in shape and surrounding said internal porous means and exposed to said environment, for restrictably passing liquid between said environment and said internal porous means, thereby allowing the moisture content of said environment to control the movement of gas through said valve through said internal porous means, whereby:
(i) liquid from said environment must penetrate said external porous means to reach said internal porous means to close said pores thereof to prevent the passage of gas from said inlet means to said outlet means, and
(ii) as said environment dries, liquid passes from said internal porous means through said external porous means to said environment until said liquid tension of said liquid in said internal porous means increases beyond said predetermined level thereof, whereupon said pores of said internal porous means open and gas passes from said inlet means to said outlet means.

11. A liquid tension-sensitive gas valve for use in an environment containing liquid comprising:

gas inlet tube means;

gas outlet tube means disposed adjacent said inlet means;

internal porous means, having a plurality of pores with pore openings that are closed when filled with liquid and that are open when the tension of liquid therein has increased beyond a predetermined level and being generally cylindrical in shape and having a central bore therethrough sealingly disposed within said valve communicating with said inlet means, for preventing the movement of gas between said inlet and outlet means when the moisture content of said internal porous means has increased to cause said tension to decrease below said predetermined level wherein said pores are closed, and for permitting said movement when said moisture content has decreased to cause said tension to exceed said predetermined level, wherein said pores are open, the other surface of said internal porous means communicating with said outlet means whereby said inlet means and said outlet means communicate through said internal porous means; and external porous means, having a plurality of pores and generally cylindrical in shape and surrounding said internal porous means and communicating with said environment, for restrictably passing liquid between said environment and said internal porous means, thereby allowing the moisture content of said environment to control the movement of gas through said valve through said internal porous means, whereby:

(i) liquid from said environment must penetrate said external porous means to reach said internal porous means to close the pores thereof, whereupon no gas passes from said inlet means through said central bore and said internal porous means to said outlet means; and, (ii) as said environment dries, liquid passes from said internal porous means to said environment through said external porous means until said surface tension of said liquid in said first porous means increases past said predetermined level thereof, whereupon gas passes from said inlet means to said outlet means through said central bore and said internal porous means.

12. A method of gating air from a particulate planting medium to an actuator means controlling an irrigation device applying water to said medium, comprising:

sensing the level of moisture at a first region of said planting medium with a first porous moisture-sensing device, said first device restricting air movement from said medium through said device when the planting medium in contact therewith has reached a predetermined high moisture level wherein the moisture within said planting medium has closed the pores in said first device, and said first device permitting the passage of air from said medium through said first device when the moisture condition of said contacting planting medium is below said predetermined level, wherein said pores begin to open;

providing an air passage from said first device in said first region of said planting medium to a second porous moisture-sensing device in a second region of said planting medium;

sensing the level of moisture at said second region of said planting medium with said second porous moisture-sensing device, said second device restricting air movement from said first device through said second device when the planting medium in contact therewith has reached a predetermined high moisture level, wherein the moisture within said planting medium has closed the pores of said second device, and to permit the passage of air from said first device to said second device when moisture condition of said contacting planting medium is below said predetermined level, wherein said pores of said second device begin to open; and providing an air passage from said second device to said actuator means, whereby:

(i) when the moisture content of said second region has decreased to said predetermined level for said second porous device, and the moisture content of said first region of said planting medium has decreased to said predetermined level for said first porous device, air is passed from said planting medium through said first and second devices to said actuator means, whereupon irrigation is provided to said medium;

(ii) when said irrigation supplied to said planting medium has raised said moisture content of said second region of said planting medium to said predetermined level for said second porous device, said second device interrupts the flow of air to said actuator means from said first region of said planting medium through said porous first device, thereby disabling said irrigation and requiring said medium to utilize said provided irrigation prior to receiving further irrigation; and (iii) when said moisture content of said first region is at said predetermined level for said first porous device, no air is passed from said medium to said second porous device through said first device, regardless of said moisture content of said second region, thereby preventing the irrigation of said medium until the moisture content of the entire medium has decreased to said predetermined level for said first device.

13. A method as defined in claim 12, wherein said step of sensing the level of moisture at said first region of said planting medium comprises:

providing a first porous member in contact with said first region of said planting medium, said first porous member having outlet means for collecting air flowing from said planting medium through said member when the moisture level of said first porous member is below said predetermined level of moisture for said first device, and said first porous member preventing said flow of air to said outlet means when said moisture level of said first porous member has exceeded said predetermined level.

14. A method as defined in claim 12, wherein said step of sensing the level of moisture at said second region comprises:

providing a first porous member in contact with said second region of said planting medium, said first porous member having a plurality of pores through which moisture can pass; and providing a second porous member in communication with said moisture-sensing device in said first region and with said actuator means and internally adjacent said first porous member, but not in contact with said second region, said second porous member restricting air movement between said moisture-sensing device in said first region and said actuator means when the moisture content of said second porous member has exceeded said predetermined level for said second moisture-sensing device, wherein moisture has closed the pores of said second porous member, and said second porous member permitting the movement of air from said first device to said actuator means when said moisture content of said second porous member is below said predetermined level, said moisture reaching said second porous member from said environment through said first member, whereby:

(i) when said second region of said environment has a moisture content greater than said predetermined level for said second moisture-sensing device, moisture passes from said second region through said first porous member to said second porous member to prevent the passage of air from said moisture sensing device in said first region to said actuator, thereby preventing said irrigation, and (ii) when said second region has a moisture content less than said predetermined level, moisture in said second porous member passes through said first porous member to said second region, thereby permitting air to pass from said moisture-sensing device in said first region to said actuator means, thereby enabling said irrigation.

15. A liquid tension-sensitive gas valve for use in an environment containing liquid, comprising:
gas inlet means
gas outlet means;
an internal porous member interposed between said gas inlet means and said gas outlet means, said internal porous member having a pore structure whereby: (i) when its moisture content has increased to the extent causing the liquid tension of the internal porous member to decrease below a predetermined level at which point the pores are closed by liquid from said environment, gas is prevented from flowing through the internal porous member from said gas inlet means to said gas outlet means; and (ii) when the moisture content of the internal porous member has decreased below said predetermined level at which point the pores are opened, gas is allowed to flow through the internal porous member from said gas inlet means to said gas outlet means;
an external porous member surrounding said internal porous member and forming a liquid-permeable barrier between said environment and the internal porous member; and
said internal porous member having a pore structure such that its bubbling tension is greater than the bubbling tension of the internal porous member.

* * * * *